United States Patent
Malamut et al.

(10) Patent No.: US 11,689,619 B2
(45) Date of Patent: *Jun. 27, 2023

(54) HIGHLY EFFICIENT NATIVE E-MAIL MESSAGE DATA PROTECTION FOR OFFICE 365

(71) Applicant: EMC IP Holding Company LLC, Hopkinton, MA (US)

(72) Inventors: Mark Malamut, Aliso Viejo, CA (US); Arun Murti, Mission Viejo, CA (US); Adam Brenner, Mission Viejo, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 351 days.

This patent is subject to a terminal disclaimer.

(21) Appl. No.: 16/831,674

(22) Filed: Mar. 26, 2020

(65) Prior Publication Data

US 2021/0306415 A1  Sep. 30, 2021

(51) Int. Cl.
*G06F 15/16* (2006.01)
*G06F 9/54* (2006.01)
*H04L 67/1095* (2022.01)
*G06F 11/14* (2006.01)
*H04L 51/42* (2022.01)

(52) U.S. Cl.
CPC ...... *H04L 67/1095* (2013.01); *G06F 11/1464* (2013.01); *H04L 51/42* (2022.05)

(58) Field of Classification Search
None
See application file for complete search history.

(56) References Cited

U.S. PATENT DOCUMENTS

| | | | | |
|---|---|---|---|---|
| 2010/0332456 | A1* | 12/2010 | Prahlad | G06F 16/1748 713/160 |
| 2013/0262586 | A1* | 10/2013 | Chan | G06Q 10/10 709/204 |
| 2013/0290598 | A1* | 10/2013 | Fiske | G06F 3/0625 711/E12.008 |
| 2014/0372567 | A1* | 12/2014 | Ganesh | H04L 67/1001 709/219 |
| 2017/0235758 | A1* | 8/2017 | Gopalapura Venkatesh | G06F 11/0712 707/625 |
| 2020/0310837 | A1* | 10/2020 | Sethumadhavan | G06F 3/0659 |
| 2021/0297487 | A1* | 9/2021 | Hegde | G06F 9/5072 |

OTHER PUBLICATIONS

Amazon, Amazon Elastic Container Service, Nov. 13, 2014, (Year: 2014).*

* cited by examiner

*Primary Examiner* — Nicholas R Taylor
*Assistant Examiner* — Ho T Shiu
(74) *Attorney, Agent, or Firm* — Staniford Tomita LLP

(57) ABSTRACT

Embodiments for a method of storing e-mail messages using a cloud native e-mail data protection process. E-mail messages are first compressed and stored in a container along with selected metadata. An Email Record is created for each e-mail message. A Container Record is created for each newly created container, and a Backup Record is created for each container for each backup. Once the required records are created, the process facilitates the execution of backup operations, such as full or incremental backups of the stored e-mail messages. Data tiering is supported so that low cost object storage in the public cloud is used instead of expensive processing methods, such as deduplication backups.

20 Claims, 6 Drawing Sheets

400 ⤵

| Object Name | Nids | IdData | Data |
|---|---|---|---|
| john47.container-1 | 5 | (0, 22), (22, 34), (56, 26), (82 36), (118, 42) | Email [1], [7], [12], [4], [8] |
| john47.container-2 | 4 | (x, y), (a, b), (c, d), (m, n) | Emails [6], [21], [14], [9] |
| john47.container-3 | 2 | (p, q), (r, s) | Emails [18], [12] |

| Eid | Bid | Cid | Index |
|---|---|---|---|
| 1 | 1 | 1 | 0 |
| 7 | 1 | 1 | 1 |
| 12 | 1 | 1 | 2 |
| 4 | 1 | 1 | 3 |
| 8 | 1 | 1 | 4 |
| 6 | 1 | 2 | 0 |
| 21 | 1 | 2 | 1 |
| 14 | 1 | 2 | 2 |
| 9 | 1 | 2 | 3 |
| 18 | 1 | 3 | 0 |
| 12 | 1 | 3 | 1 |

| Bid | Cid | Tier | LastAccess |
|---|---|---|---|
| 1 | 1 | COLD | 1/23/2019 |
| 1 | 2 | WARM | 7/14/2019 |
| 1 | 3 | HOT | 8/20/2019 |

| timestamp | dmask | Bid | Cid |
|---|---|---|---|
| t0 | 00000 | 1 | 1 |
| t0 | 0000 | 1 | 2 |
| t1 | 00100 | 1 | 1 |
| t1 | 0100 | 1 | 2 |
| t1 | 00 | 1 | 3 |

FIG. 7

HIGHLY EFFICIENT NATIVE E-MAIL MESSAGE DATA PROTECTION FOR OFFICE 365

CROSS-REFERENCE TO RELATED APPLICATIONS

This application is related to U.S. patent application Ser. No. 16/831,691 filed on Mar. 27, 2020 and entitled "Highly Efficient Native Application Data Protection for Office 365."

TECHNICAL FIELD

This invention relates generally to cloud computing applications, and more specifically to systems and methods for efficiently protecting e-mail messages in MS Office365.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

Cloud computing provides a shared pool of configurable computing resources (e.g., computer networks, servers, storage, applications and services) that can be rapidly provisioned and released with minimal management effort. Cloud computing allows users with various capabilities to store and process their data in either a private cloud or public cloud (e.g., third-party owned cloud network) in order to make data accessing mechanisms easier and more reliable. Large-scale cloud computing infrastructure and services are often provided by cloud providers that maintain data centers that virtually consolidate vast computing resources such as storage and processing power.

Cloud computing platforms are often used to provide access to popular computer applications. Microsoft (MS) Office365 is an example of an online version popular desktop or server-based applications. MS Office365 is a version of the Microsoft Office suite that is hosted in a cloud network, and comprises applications such as word processors, spreadsheets, presentation programs, electronic mail (e-mail), and other similar productivity applications.

Data protection of applications such as those in the regular (i.e., native or offline) Microsoft Office suite has been available for many years. Until recently, this protection has primarily relied upon on-premise infrastructures. As these applications have also become available as cloud-based or pure SaaS (Software-as-a-Service) products (e.g., MS Office365), there is a need to offer data protection of these applications under the SaaS model. However, while Microsoft Office365 supports rudimentary data protection, it does not provide more sophisticated capabilities such as protecting Point-in-Time (PIT) backup images. That is, present data protection methods do not protect multiple and arbitrary points in time for MS Office365 applications.

Furthermore, although some present systems (e.g., DellEMC Avamar MS Exchange backup) use deduplication technology to reduce costs, these are an on-premises solutions and usually have a hardware platform and limited access data tiering capabilities. In these systems, the compute cost is a sunk cost and therefore optimizes storage size as there is no incremental cost for processing. However, the deduplication processes themselves are computationally expensive.

What is needed, therefore, is a data protection system that provides PIT protection for Office365, and other similar cloud or SaaS-based application suites, and specifically protection of e-mail messages. What is further needed is a method for providing efficient protection for Office365 Microsoft Exchange data on object storage to balance the cost factors of compute resources versus data storage cost by taking advantage of the fact that object storage is generally cheaper than compute resources, as is generally true in the public cloud.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 4 is table that illustrates example entries of Container Data, under some embodiments.

FIG. 5 is a table that illustrates example entries of an Email Record, under some embodiments.

FIG. 6 is a table that illustrates example entries of a Container Record, under some embodiments.

FIG. 7 is a table that illustrates example entries of a Backup Record, under some embodiments.

DETAILED DESCRIPTION

Figure 1:
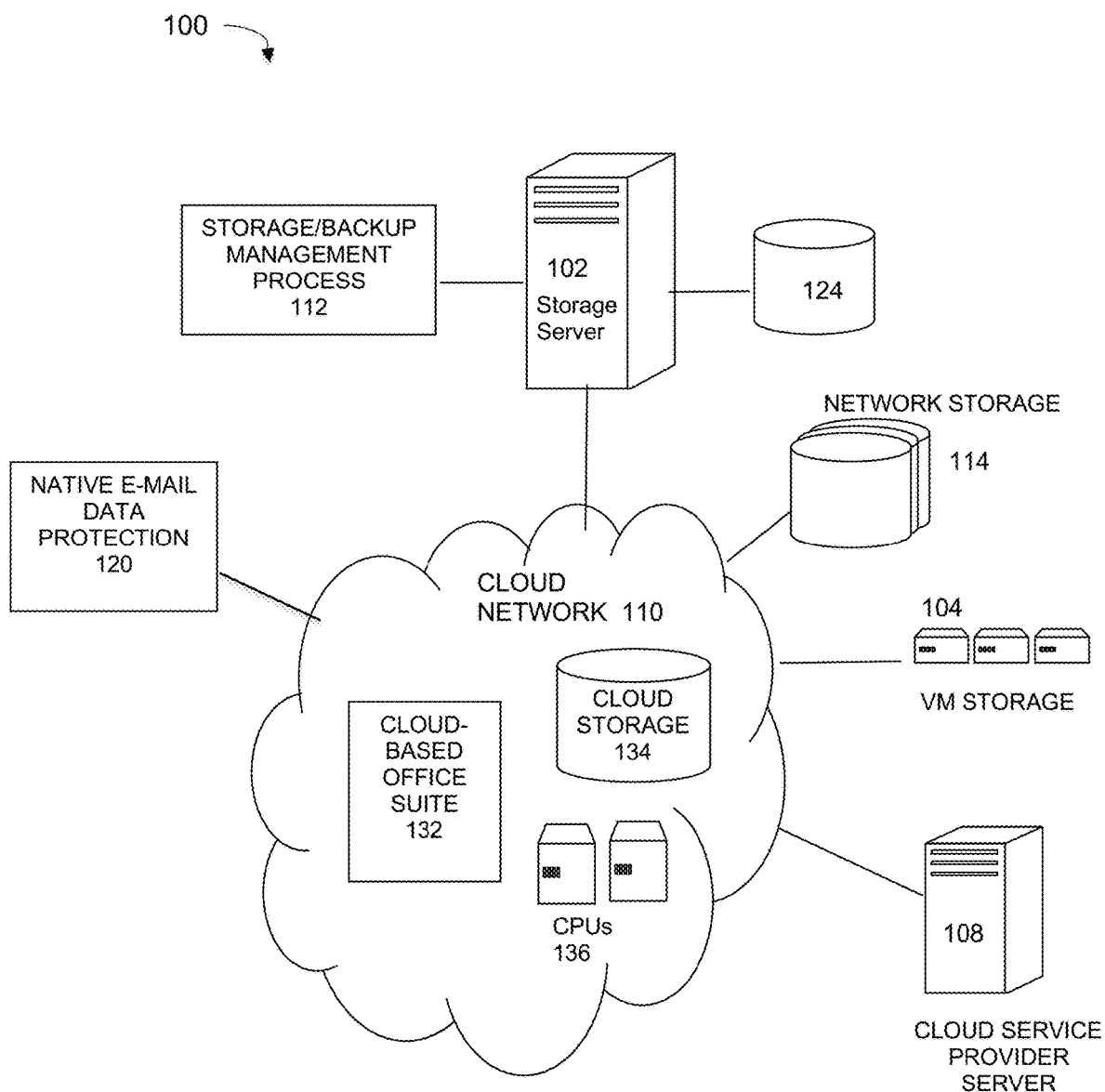
FIG. 1 is a diagram of a cloud computing network implementing an online application suite e-mail data protection process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve data processing in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a cost-efficient model for the SaaS protection of Office365 Exchange data to the public cloud that takes advantage of the economics of the public cloud. Specifically, embodiments are directed to a native e-mail data protection method that requires minimal compute resources and leverages cloud storage, which is typically cheaper than compute resources in the public cloud. Although embodiments may be described with respect to the MS Office365 platform, it should be noted that other similar cloud or SaaS-based program suites may also be used. Likewise, though embodiments are directed to e-mail applications and e-mail messages or other e-mail files, embodiments are not so limited, and any appropriate application, application file or data structure can also be used. Furthermore, although directed to public cloud environments, embodiments can also cover other data targets such as privately owned object storage target, on-premise object storage, or any other appropriate networked storage media.

FIG. 1 illustrates a computer network system that implements one or more embodiments of a cloud storage network system implementing a native e-mail data protection process, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as storage server 102 or other data source, in the network environment. The data sourced by the data source may be any appropriate data, such as database data that is part of a database management system, and the data may reside on one or more hard drives for the database(s) in a variety of formats.

The network server computers are coupled directly or indirectly to the data storage 114, target VMs 104, and the data sources and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

In an embodiment, cloud network 110 may be a private network or it may be a public network provided by a third-party cloud service provider 108 (CSP). In this case, at least part of the infrastructure of network 110, such as servers, routers, interfaces and so on are provided to users such as storage server 102 as an IaaS (Infrastructure as a Service), SaaS (Software as a Service), PaaS (Platform as a Service), or other type of arrangement. CSP's typically provide service under a service level agreement (SLA) that establishes the terms and costs to use the network and transmit/store data specifies minimum resource allocations (e.g., storage space) and performance requirements (e.g., network bandwidth) provided by the provider. The cloud service provider server 108 may maintained be any company such as Amazon, EMC, Apple, Cisco, Citrix, IBM, Google, Microsoft, Salesforce.com, and so on.

The cloud network 110 provides several different resources to users or subscribers, such as cloud storage 134 for storing files, documents, and other data, along with processor or compute resources in the form of accessible servers or CPUs 136. Any number of processors and storage devices may be allocated or accessible to a user typically for a subscription fee charged by the cloud service provider 108. Much of the cost incurred by the user may be on a per usage basis, such that the user is charged for storage amounts used (e.g., Gigabytes or Terabytes of data per week or month) and for processing usage. In present public cloud environments, cloud storage 134 is typically relatively cheap in terms of dollar cost as compared to compute resources 136. For the embodiment of FIG. 1, cloud network 110 also provides access to application programs through a cloud-based office suite 132. Such programs can include word processors, drawing programs, databases, spreadsheet programs, and so on, as part of a unified product available from a vendor. One relevant example of such a suite is the Office365 suite available from Microsoft Corp. and supported on the Microsoft cloud network.

Figure 2:
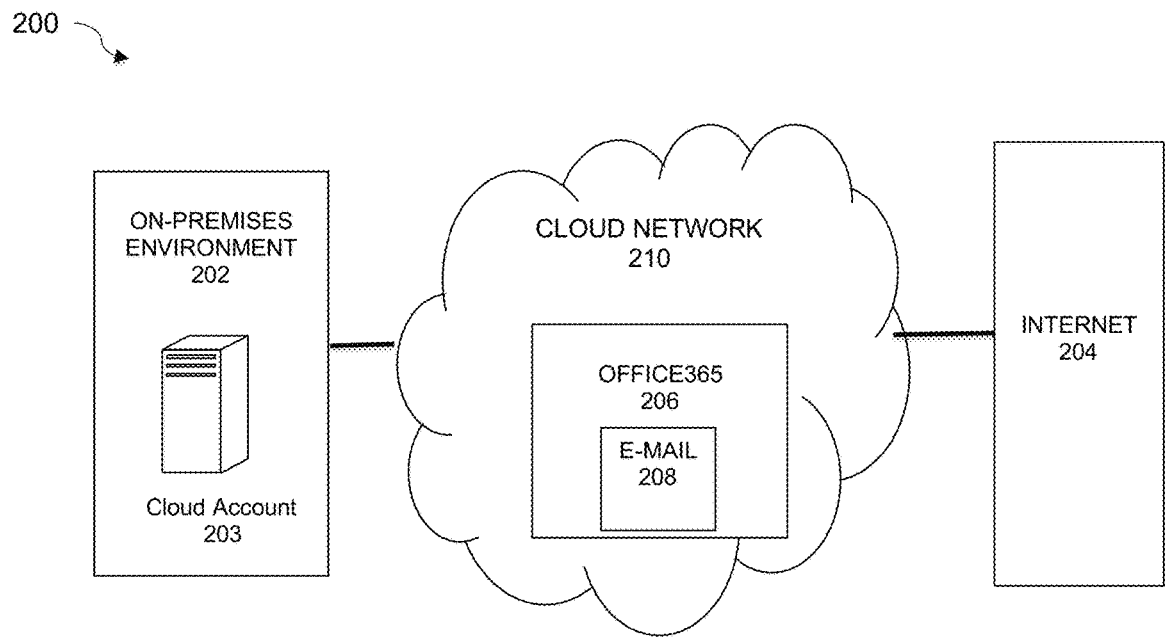
FIG. 2 is an example e-mail processing system implemented in an online application suite, under some embodiments.

One significant application supported by the cloud-based office suite 132 is an electronic mail messaging service that transmits, processes, and stores e-mail messages in the cloud for a user. FIG. 2 is an example e-mail processing system implemented in an online application suite, under some embodiments. For the embodiment of system 200, cloud network 210 includes an Office365 suite, which includes an e-mail server 208. The user's on-premises environment 202 has its own server or servers with a cloud account 203 typically set up for the user by a CSP or other provider, and that can be used as the data target for the e-mail data. The user subscribes to the cloud-based e-mail service 208 provided as part of the Office365 (or other) suite 206 that resides on public cloud 210. The cloud-based e-mail servers 208 may use SMTP, IMAP, POP, and any other appropriate protocol. This platform facilitates the flow of e-mail from the user's premises to the Internet 204. In this case, certain connectors may be required to enable mail flow in both direction between Office365 and any SMTP-based e-mail server, such as Exchange or a third-party e-mail server.

FIG. 2 is one example of a cloud-based e-mail service and infrastructure and other embodiments are also possible. For example, the data target for the e-mail data may be on-premises 202, such that e-mail data is stored locally, but typically as many compute and storage resources as possible are housed in the cloud 210 for the user.

E-mail programs represent a unique program within a SaaS or cloud-based environment in that they typically generate large amounts of data on a regular basis and are usually uniformly formatted and indexed. Regular business users may receive up to hundreds or thousands of e-mail messages a day. Each e-mail message itself may be relatively small in terms of size, but they may contain attachments or embedded files that can be large, such as photos, .PDF files, audiovisual (A/V) content, and so on. Many organizations have strict rules or policies dictating the storage, archiving, purging, and overall management of e-mail messages due to storage overhead and privacy or other regulatory rules. Due to often sensitive or valuable data stored in e-mail messages, proper data protection of current, aging, and archived e-mail messages is of great importance to most enterprises and organizations.

As shown in FIG. 1, cloud network 110 may include cloud storage resources 134. In general, cloud storage is a model of data storage in which the data is stored in logical pools. The physical storage spans multiple servers, and the physical environment may be owned and managed by a hosting company 108 that keeps the data available and accessible, and the physical environment protected and running. The cloud storage 134 may be implemented as a hosted object storage service, but can also include other types of data storage that are available as a service, such as block storage.

In an embodiment, the data cloud native e-mail data protection process 120 maintains all e-mail messages to be persisted in object storage. Unstructured data is often stored in cloud storage in a cloud object storage format or simply object storage format. Object storage architecture stores and manages data as objects compared to block storage, which handles data as blocks, and logical volumes and file storage which store data in hierarchical files, and is appropriate for cloud applications because it is elastic, flexible and it can more easily scale into multiple petabytes to support virtually unlimited data growth. Object storage is not particularly suitable for storage applications with high transactional rates, as it is generally not consistent enough for real-time systems such as transactional databases. For long-term or archival storage of large amounts of data, however, it offers significant advantages over block and file-based storage.

The object storage format includes a globally unique identifier for each object along with customizable metadata that is separated to enable other capabilities such as application and user-specific data for indexing. An object identifier is an address tied to the object, which enables the object to be found over a distributed system. Objects may be spread across multiple data centers and data can be found without the user knowing the specific physical location of the data. Object storage, along with the metadata, can be accessed directly via application program interfaces (APIs), HTTP and HTTPS. That differs from block storage volumes, which only can be accessed when they are attached to an operating system. In object storage systems, the data is bundled with the metadata tags and the unique identifier. These objects are stored in a flat address space, making it relatively easy to locate and retrieve the data. This flat address space storage thus helps eliminate the complexity and scalability challenges of hierarchical file system architectures.

In an embodiment, system 100 represents a Data Domain system that uses cloud object storage 134 as the target storage for the Office365 applications, including e-mail messages. Such e-mail messages are intended to be protected by the usual deduplication processes executed by backup server 102. While protecting Office365 Exchange data, it is important that the overall solution be efficient from cost and performance perspectives. In order to support this, the storage media and processing (compute) costs must be considered in addition to solution simplicity. While any system must support restores, the performance of restoring e-mail messages (and other Office365 data) is traded off for a cost reduction as restores occur with much less frequency than backups.

Public cloud providers generally support multiple tiers of storage, and there are often significant cost differences between tiers. As an example, Amazon Web Services (AWS) storage classes can differ in cost by a factor of five between the hottest and coldest tiers. Embodiments of the cost effective data tiering process 112 help meet all of the above criteria and supports data tiering, as well. This process requires minimal compute for the most common use case (backup) and instead of using complex, compute intensive data reduction methods such as deduplication, it achieves cost efficiency by moving data to lower cost object storage tiers.

As stated above, the underlying data of the process stores all e-mails to be persisted in object storage. In addition, a lightweight database, such as SQLite, is used to maintain e-mail backup related system metadata. SQLite is an example of a lightweight, portable database that is self-contained, and other similar databases that can be used. In an embodiment, there is a single instance of the SQLite database per end-user e-mail account. The SQLite database in addition to the related e-mail data will be persisted in object storage. In general, the terms "e-mail message," "e-mail," or "email" all refer interchangeably to a data message, file, document, or any other data object sent or processed by the e-mail server 208 of the Office365 suite in cloud network 210, or any other similar online system.

With respect to the data model, four data structures are defined. There are three system metadata records, denoted as the Backup Record, the Container Record and the Email record, in addition to the actual data record denoted as the Container Data that holds the e-mails and selected metadata. The SQLite file will be persisted into object storage and will be loaded into compute memory during a backup, restore or any other operation. Upon completion of any operation, the updated SQLite database will be written back to object store. This data model provides the advantages of (1) a reduced metadata size, (2) the ability to track and manage data tiering, and (3) the ability to easily perform certain compliance operations (e.g., delete all references to a set of e-mails).

In an embodiment, e-mail messages will be grouped together into a Container Data (container) object that can hold up to 1024 e-mail messages and relevant metadata (or similar numbers). Each of these objects will be stored in an object store bucket located within a cloud account. Containers are implemented as write-once objects and will not be modified.

The Email Record (ER) holds metadata and location information about each e-mail message and is used for partial restores and delete operations. There is typically one ER record per e-mail. The Container Record (CR) holds metadata and location information about each container. There is typically one CR record per Container Data (CD) object, and can be used to support data tiering. This record is global, and shared by all backups. The Backup Record (BR) holds a pointer to a record that holds the container location, a bitmask (the delete mask or dmask), and the backup timestamp. There is typically one BR record per container for every backup point-in-time (PIT). This model enables efficient common operations such as deletion of an e-mail, tiering to containers to lower cost storage and full mailbox restores.

Figure 3:
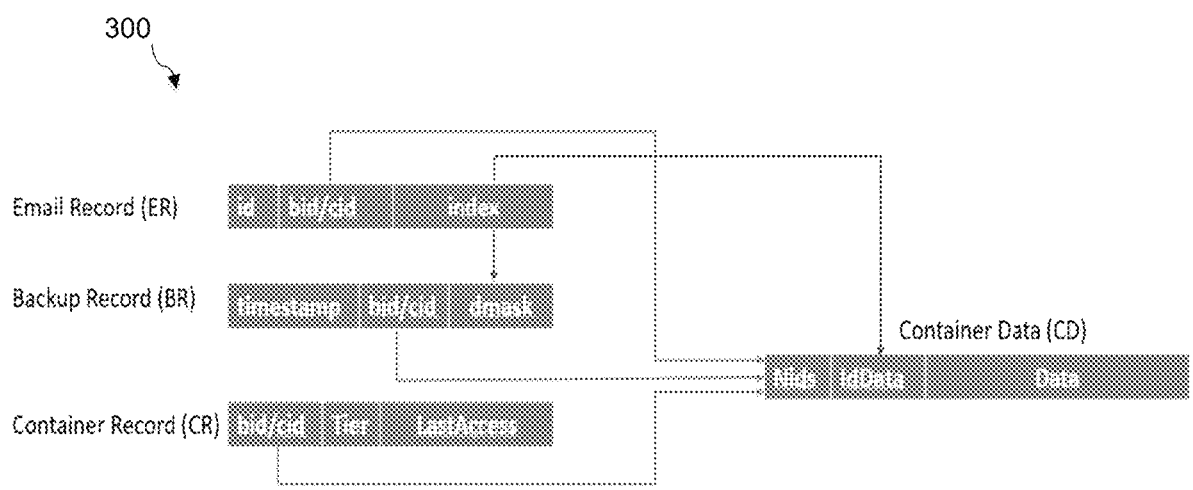
FIG. 3 is an entity-relationship diagram of the Email Record, Backup Record, Container Record, and Container Data, under some embodiments.

FIG. 3 is an entity-relationship diagram 300 of the Email Record, Backup Record, Container Record, and Container Data, under some embodiments. As shown in FIG. 3, the Email Record (ER), Backup Record (BR) and Container Record (CR) are data structures that reference the Container Data (CD) through linkages of different fields within their respective data structures. The data fields of each individual record (ER, BR, CR) and the CD will be discussed in greater detail below. Generally, the Container Data is indexed by the Email Record and an ID data field and the interactive data fields of the ER, BR, and CR records.

In an embodiment, the Container Data (CD) is stored as a single object in a particular object store bucket. It holds selected metadata and a compressed version of the data stream returned from the Office365 API. It is written when created and only read during a restore operation. Containers will hold up to 1024 e-mail messages as it maintains a balance between the size of a container and the number of containers required per backup. An example format of the Container Data, such as shown in FIG. 3, may be as follows:

| Nids | IdData (offset, length) | Data |
| --- | --- | --- |

The Nids entry of the Container Data is the number of e-mail messages in the data stream. The IdData entry is absolute byte offset and length of each e-mail in data stream (based on compressed data). The Data entry is a compressed stream of data from Office365 graph API. FIG. 4 is a table 400 that illustrates example entries of Container Data, under some embodiments. In FIG. 4, the Object Name is the object/file name of the container within a bucket and is not stored in the actual container. Each element in IdData represents a single e-mail offset and length pair that maps to each e-mail respectively within the data stream. The numbers in the Data field represent the e-mail contents for each id. The Office365 E-mail Id is not stored separately in the container as it is already part of the data stream. In the example of FIG. 4, E-mail Id 1 is the first email in the data stream in john47.container-1 (offset=0) and is 22 bytes long, Email Id 12 is the 3rd email at offset 56 with a length of 26 bytes, and so on.

The e-mail Record (ER) holds metadata and location information about each e-mail and is used for partial restores and deletes. There is one ER per e-mail. An example format of the Container Data, such as shown in FIG. 3, may be as follows:

| Eid | Bid | Cid | index |
| --- | --- | --- | --- |

The Eid entry is the Office365 Email Id. The Bid entry is the Bucket ID where the container exists. The Cid entry is the Container ID/object name within the bucket. The Index entry is the index into container where the e-mail exists. FIG. 5 is a table 500 that illustrates example entries of an e-mail Record, under some embodiments. The values shown are intended to be for example illustration only, and other values or formats may be used. For example, the Eid entries are shown as integer values for example purposes only.

As per the Container Data description above, Email ID 12 is the third entry in container 1. The contents of this e-mail message starts at byte offset 56 in the CD data segment and is 26 bytes long. It should be noted that the index is only 10 bits in length (max 1024 e-mail messages per container) and can be held in a 16 bit short data type. The actual offset and length of each e-mail are held directly in the container and will require up to 64 bits; 32 bits are required for the offset into the container and 32 bit are required for the length of each e-mail message. The offset and length are only required when the container is read (during a restore operation) and therefore are stored in the container IdData structure. As the ER will have the most rows (by far) in the SQLite database, this organization minimizes the size of the database which enables the processing to be more resource efficient. The realized efficiency will depend on the size of the ID used by the underlying system.

The Container Record (CR) holds metadata and location information about each container. There is one CR per container. If the cloud provider native tiering capabilities are not usable, then this record provides the data necessary for this invention to perform data tiering. An example format of the Container Data, as shown in FIG. 3, may be as follows:

| Bid | Cid | Tier | LastAccess |
|---|---|---|---|

The Bid entry is the bucket ID where the container exists. The Cid entry is the container ID/Object Name within the bucket. The Tier entry indicates whether the tier is hot, warm or cold. The LastAccess entry is a timestamp of container write (create) date or most recent read date. The goal is to tier data that has not be read as soon as possible in order to reduce storage costs. If the provider native tiering capabilities are insufficient, this field will be used as follows. The field is updated when a container is accessed (read) to support a restore operation. It is checked periodically (daily or weekly) to determine if the container should be tiered. There may be multiple tiering timeframes (e.g., 30 days for hot to warm, 90 days for warm to cold). The tiering of a container can be done in accordance with one or more data movement policies, such as based on an aging of the messages, such that older messages are moved first, or based on a set priority flag, user identity, or other marking mechanism.

If a container has been tiered out from the hot tier and a restore operation will require data from the container, the system will move the container back to the hot tier and then perform the restore. The restore operation may need to be delayed as moving a container back to the hot tier may not be an instantaneous operation. Whenever a container is read (e.g., during a restore), the timestamp will be updated to the current date. FIG. 6 is a table 600 that illustrates example entries of a Container Record, under some embodiments. As shown in FIG. 6, typical entries for table 600 include the tier level (e.g., cold, warm, hot) in terms of last access time with hot tiers accessed most recently in terms of date or time, and cold or colder tiers accessed earlier. Other ranges are also possible using different scales, such as 1-5, new-medium-old-stale, and so on.

The Backup Record (BR) consists of a reference to a container, a bitmask and the backup timestamp. There is one BR per container for every backup point in time (PIT). The Delete Mask (dmask) indicates which e-mails are valid in the container per backup. It will have a 0 bit set for each valid e-mail and a 1 bit indicates there is no valid e-mail at the corresponding position. If a container is not full (i.e., less than 1024 e-mail messages), then the trailing bits will be set to 1 in order to indicate that there is no e-mail at that relative position. For example during a full backup, if a container only holds 1022 e-mail messages, the dmask will consist of 1022 zero bits followed by 2 one bits. During an incremental backup any deleted (or modified) email will have its respective bit in the dmask set to 1. An example format of the Backup Record (BR), as shown in FIG. 3, may be as follows:

| timestamp | dmask | Bid | Cid |
|---|---|---|---|

The timestamp entry is the date of backup PIT. The dmask entry is the bitmask (128 bytes=1024 bits), where each 0 bit indicates the corresponding e-mail within the container is part of the PIT backup, while a 1 bit indicates the e-mail is not valid in that container for the specified PIT. The bit number (0-1023) is the index used to determine the e-mail entry in the Container Record IdData. The Bid entry is the bucket ID where the container exists. The Cid entry is the Container ID/Object Name within the bucket. FIG. 7 is a table 700 that illustrates example entries of a Backup Record, under some embodiments. For the example of FIG. 7, at t0, two containers were created for the L0 backup, and container 1 has five e-mails and container 2 has four e-mails. At time t1, one e-mail message was deleted from container 2 [emailID=21 at index 1], container 3 was created and contains two e-mail messages: new emailID 18 and a modified version of emailID 12 (which is marked as invalid from container 1 at 0). When an e-mail message is deleted (or modified which is a delete followed by an add), the corresponding dmask bit in BR is set to 1.

Cloud-Based E-Mail Data Protection Process

In an embodiment, the overall process of protecting cloud-based e-mail messages involves storing e-mail messages, performing the backup (full or incremental), recovering individual e-mail messages, and/or performing full Point-in-Time recovery operations. Other processes involve data tiering and garbage collection.

Figure 8:
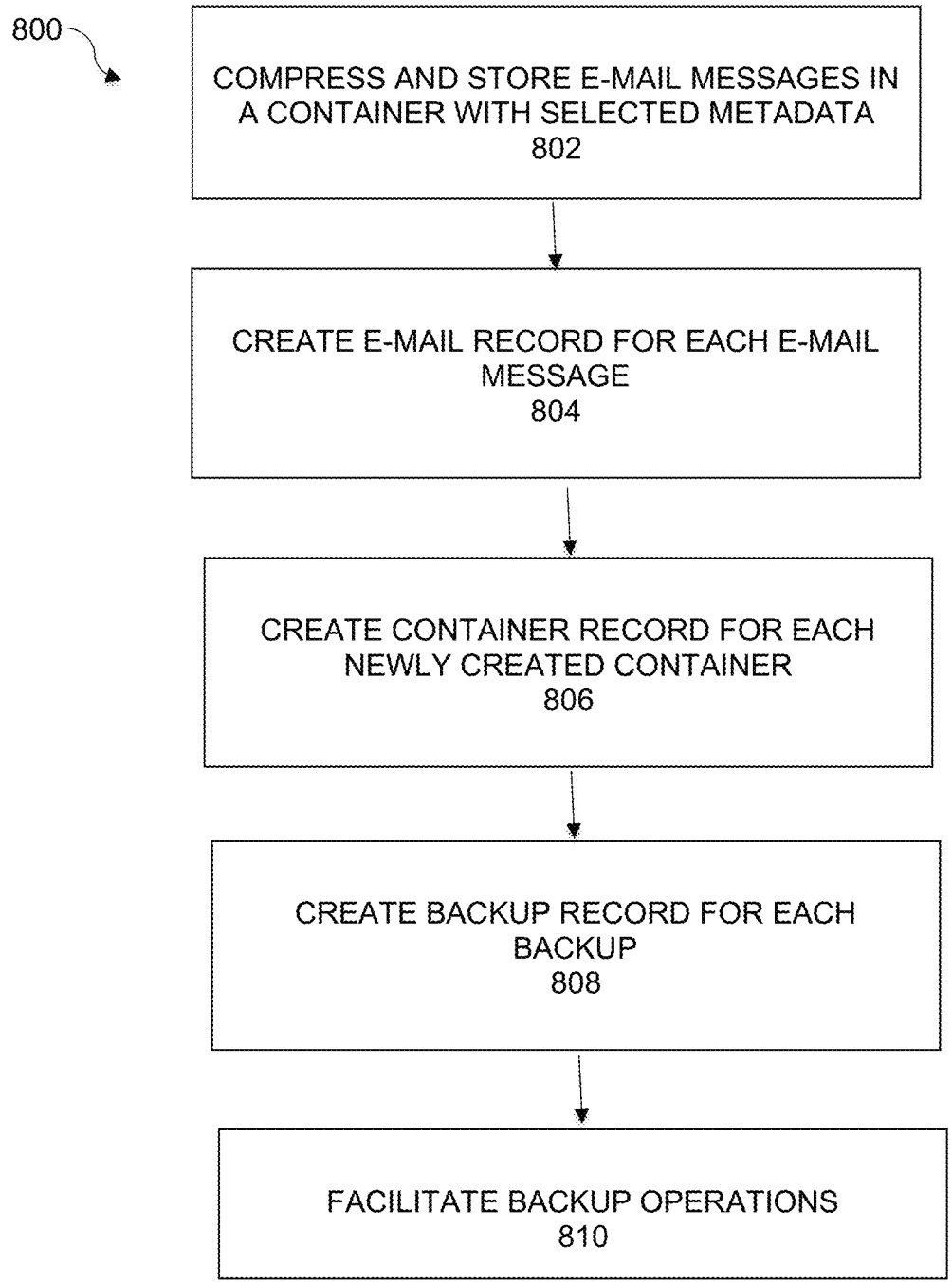
FIG. 8 is a flowchart that illustrates a method of storing e-mail messages using a cloud native e-mail data protection process, under some embodiments.

FIG. 8 is a flowchart that illustrates a method of storing e-mail messages using a cloud native e-mail data protection process, under some embodiments. With respect to storing e-mail messages, e-mail messages are first compressed and stored in a container along with selected metadata, 802. Each container will hold up to 1024 e-mails. An e-mail Record will be created for each e-mail message, 804. A Container Record is created for each newly created container, 806, and a Backup Record is created for each container for each backup, 808. Once the required records are created, the process facilitates the execution of backup operations, 810, such as full or incremental backups of the stored e-mail messages.

In order to backup an e-mail account, the backup process will initially perform a full backup. This involves performing a full query against the Office365 graph API. This API will return the current state of the e-mail box, which is a list of all e-mail messages. These e-mails will be stored as previously described. A number, N, containers will be created, which is as many as needed to satisfy the number of e-mail messages to be stored. The system metadata records will be created and inserted into the SQLite DB.

Incremental backup data will be retrieved from Office365 by requesting the changes from the prior full or incremental backup point in time. Each incremental backup will consist of a series of e-mails deleted, added and changed. Initially a copy of the Backup Record records from the previous point in time will be made and the timestamp will be changed to reflect the current incremental time. Changed e-mails will be processed as a synthetic e-mail delete followed by an e-mail add. Deleted (actual or synthetic) e-mails will first read the e-mail Record to find the index (i) and container associated with the e-mail being deleted. Next the Backup Record that contains the CID for this backup will be located and bit i of the dmask will be set to '1'. Added e-mails new or synthesized from a modify operation will be added as described above.

For individual e-mail message recovery, using an e-mail ID and timestamp, the container that holds the target e-mail message can be found. First, the set of e-mail Records that have the target e-mail ID are retrieved. Next the Backup Record table is queried for the desired timestamp to find the container IDs of interest from the set of container ID's retrieved from the e-mail Records. If there is more than one result (an e-mail has been modified), then the dmask bit for each container related to the e-mail ID is examined. If the bit is zero, then the target e-mail message has been located.

The process first queries e-mail Records for the e-mail ID, which is to generate a list of Cid and e-mail index. Second, it queries the Backup Records for all container IDs from the result in the first step and the timestamp. Third, using this set of Backup Records, it checks the dmask using the index from the first step to find a zero bit. Typically, a small number of ad-hoc e-mails are restored so the performance is not critical.

For a full point-in-time recovery, the process uses a timestamp to find all the containers from the Backup Record. From each container, restore every e-mail message where the appropriate dmask bit in the Backup Record is zero.

In an embodiment, the Container Record may be used to support data tiering. The last access timestamp in the Container Record will be updated when a container is created or when a new backup refers to an existing container. When containers are created, they are placed in highly available storage (hot). Containers that have not been referenced for a period of time (e.g., 30 days) are moved down to a warm tier and those not referenced for a set period of time (e.g., 90 days) are moved to the cold tier. Accessing data from a cold tier may require special workflows and therefore containers are moved on a scheduled basis. The actual tiers and times to move a container will depend on the complexity and economics of a specific cloud infrastructure. It should be noted certain cloud environments, such as AWS and Azure have automatic data tiering capabilities. Depending on the infrastructure and economic, the use of automatic versus manual tiering can be evaluated.

With respect to garbage collection (GC) processes, removing unused containers can be performed in an efficient manner. Containers that are unused will have all of their dmask bits set to −1 for every Backup Record that refers to the Container Id (bid/cid). These can be easily be found by performing a simple query against the Backup Record. This enables a straightforward solution to garbage collection processes.

Embodiments of the data tiering process take a unique approach by using a bitmap to provide a highly efficient storage model to indicate the valid/invalid within a container for any Point-in-Time backup. It keeps the compute costs low for the typical workflows (backup) by relying on low cost object storage with data tiering as opposed to using complex, resource intensive method such as deduplication. As such, it overcomes disadvantages associated with present solutions, such as those that use deduplication technology to reduce costs. Embodiments take advantage of the economies of the public cloud by relying on minimal compute (no expensive deduplication processing) and instead relies on more storage consumption which is less expensive even when stored in the highest of availability storage tiers.

System Implementation

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Following is example computer programming code (pseudo-code) for an example full (level 0) backup workflow, under some embodiments.

```
Function Level0Backup {
    timestamp = NOW()
    len = 1
    while (len > 0){
        emails = getEmails(userAccount, 1024)
        len = emails.count
        bid, cid = getEmptyContainer()
        cd = new Container(bid, cid)
        for i = 0 : emails.count {
            IdDdata = IdData + (emails[i].offset, emails[i].length)
            ER.save(emails[i].id, bid, cid, i)
        }
        cd.save(emails.count, IdData, emails)
        CR.save(bid, cid, HOT, timestamp)
        dmask = setOnBits(emails.count, 1023) // Turn on (set to 1)
bits for email slots that are empty - starting from bit #
email.length thru 1023
        BR.save(bid, cid, dmask, timestamp)
    }
}
```

Following is example pseudo-code for an example incremental backup workflow, under some embodiments.

```
Function IncrementalBackup {
  timestamp = NOW()
  copyBR(timestamp − 1, timestamp) // create a copy of all BR from
the prior timestamp setting the timestamp to NOW() in the new records
  len = 1
  while(len > 0) {
    incrEmails = getIncrEmails(userAccount, 1024)
    len = incrEmails.count
    for email : incrEmails {
      switch (email.operation){
        case DELETE : deleteEmail(email.id, timestamp); break;
        case MODIFY : deleteEmail(email.id, timestamp);
addEmail (email); break;
        case ADD : addEmail(email); break;
      }
    }
  }
}
```

// can be called during incremental or some other delete workflow. Incremental can not invalidate an entire container but another arbitrary delete (email or backup) workflow may.

```
Function deleteEmail(emailId, timestamp){
    rsER = "SELECT * FROM ER Where emailId = " + emailId
    rsBR = "SELECT * FROM BR where bid, cid, timestamp =
" rsER.bid,
rsER.cid, timestamp
    dmask = rsBR.dmask | setOnBit(rsER.index) // turn on the bit at
index. Return the full bitmask
    if(dmask == −1){ //Current backup has no references to the
```

-continued

```
container
    cleanupContainer(rsBR) // delete container and email pointers
if there are no valid references to it
        // During other delete workflows (e.g. compliance - delete all
instances of an email),
        // if there are no other reference to bid/cid the
container can be deleted.
        // This is an advantage of a single sqlLite db per user
    }
    else
        rsBR.update("Set dmask = " + dmask)
}
```

Following is example pseudo-code for an example restore full backup workflow, under some embodiments.

```
Function restoreFullBackup(timestamp){
    for rsBR : "SELECT * FROM BR Where timestamp = " + timestamp
{
        if(rsBR.dmask != -1) {
            restoreEmails (rsBR.bid, rsBR.cid, rsBR.nids, rsBR.dmask)
        }
    }
}
Function restoreEmails(bid, cid, nids, dmask){
    if(allZeros(dmask, nids)
        restoreCD(bid, cid)
    else {
        for i=0 : nids - 1 {
            if(isBitZero(dmask, i)){
                restoreCD(bid, cid, i)
            }
        }
    }
}
```

Following is example pseudo-code for an example restore single e-mail message workflow, under some embodiments.
```
Function restoreSingleEmail(emailId){
    rsER="SELECT * FROM ER WHERE Eid="+emailId
    rsBR="SELECT * FROM BR WHERE bid, cid=" rsER-
        .bid, rsER.cid restoreCD(rsER.bid, rsER.cid, rsER.in-
        dex)
}
```
Following is example pseudo-code for an example garbage collection workflow, under some embodiments.

```
Function GC {
    for rsBR : "SELECT * FROM BR WHERE dmask = -1" {
        cleanupContainer(rsBR)
    }
}
Function cleanupContainer(rsBR){
    rsBR.delete()
    rs = "SELECT * FROM BR WHERE dmask != -1 AND bid,cid = "
+
    rsBR.bid, rsBR.cid
        if(rs.count == 0){
            CD.delete(bid, cid)
            CR.delete(bid, cid)
            ER.delete(bid, cid )
        }
}
```

Figure 9:
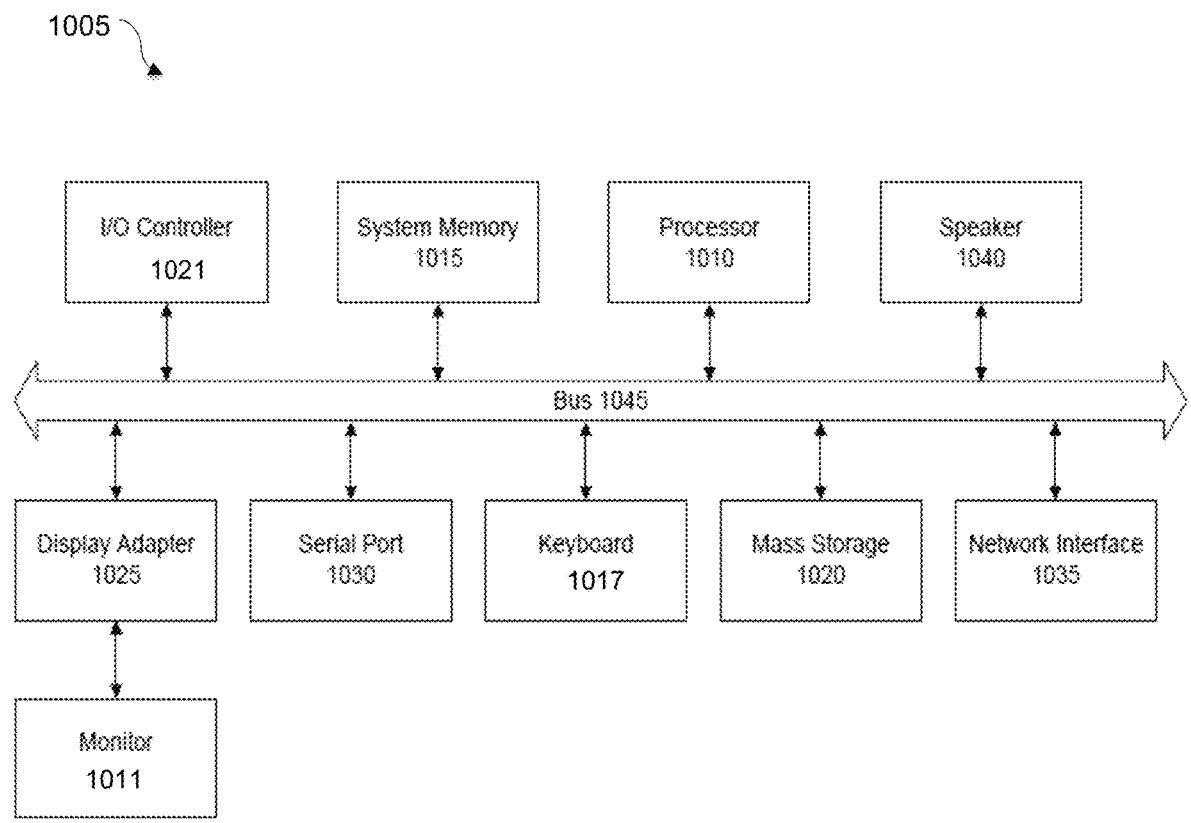
FIG. 9 is a system block diagram of a computer system used to execute one or more software components of the consistency check process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 9 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 9 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing data protection for cloud-native electronic mail (e-mail) files, comprising:
   accessing the e-mail files provided as a Software-as-a-Service (SaaS) product comprising e-mail messages stored in object-based storage format in object storage and including a globally unique identifier (ID) for each message;
   compressing e-mail messages using a data compression method;
   storing the compressed e-mail messages in a container of a plurality of containers along with selected metadata, the container holding container data formatted as a number of documents indicator (NID) for documents in a data stream received through an application programming interface (API) of the SaaS product, a respective ID, and respective content data for each message;
   creating an Email Record for each e-mail message;
   creating a Container Record for each created container;
   creating a Backup Record for each container in a backup operation comprising one of a full backup or an incremental backup;
   grouping the e-mail messages together into a Container Data (CD) object of the container having e-mail message data respectively associated with a data ID field and a number of IDs (Nids) field;
   first linking the Email Record to the Container Data through an index that references the data ID field and a respective bucket ID/container ID field that references the Nids field;
   second linking the Backup Record to the Container Data through a respective bucket ID/container ID field that references the Nids field; and
   third linking the Container Record to the Container Data through a respective bucket ID/container ID field that references the Nids field.

2. The method of claim 1 further comprising:
   storing the Container Data object in an object stored denoted as a bucket corresponding to the bucket ID and located within a cloud computing account of a public cloud network.

3. The method of claim 2 wherein the container is configured to be a write once object, and holds up to 1024 e-mail messages.

4. The method of claim 2 wherein the Email Record holds metadata and location information about each e-mail message for partial restore and delete operations, and wherein there is one Email Record for each e-mail message.

5. The method of claim 2 wherein the Container Record holds metadata and location information about each container and is shared by all backup operations, and wherein there is one Container Record per container.

6. The method of claim 5 wherein the Backup Record comprises a pointer to a record that holds the container location, a delete bitmask (dmask), and a timestamp of a respective backup operation, and wherein there is one backup record for each point-in-time (PIT) backup.

7. The method of claim 2 wherein the cloud storage comprises storage media resident in a cloud computing network maintained by a cloud service provider, and provided for long term retention of the data objects, and wherein the storing step comprises storing the e-mail messages to the cloud storage media consisting of a plurality of data tiers based on storage cost.

8. The method of claim 7 wherein a full backup is performed by:
   performing a full query against a graph API (application programming interface) of the cloud-native electronic e-mail application to retrieve a list of all e-mail messages;
   creating a number of required containers for all the e-mail messages based on the number of e-mail messages per container;
   creating system metadata records for each container; and
   storing the system metadata records in a lightweight, portable database.

9. The method of claim 7 wherein an incremental backup is performed by:
   requesting changes from a prior full or incremental backup point in time, wherein each incremental backup comprises a series of e-mail messages that are added, deleted or modified since a prior point in time;
   making a copy of a Backup Record from the prior point in time;
   changing a timestamp of the Backup Record to reflect a current incremental backup time;
   processing changed e-mail messages as a synthetic e-mail delete followed by an e-mail add;
   reading, for a deleted e-mail message, the Email Record to find an index and container associated with the deleted e-mail message; and locating a Backup Record that contains a container ID for the deleted e-mail message and setting the dmask value to binary 1.

10. The method of claim 9 further comprising performing a full point-in-time recovery operation by:
finding all containers from the Backup Record using an appropriate timestamp; and
restoring, from each container, every e-mail message where the dmask value is set to binary 0.

11. The method of claim 9 further comprising performing a recovery of an individual e-mail message by finding a container that holds the individual e-mail message using an e-mail ID and a timestamp by:
retrieving a set of Email Records that have the e-mail ID;
querying a Backup Record table for the timestamp to find container IDs of interest from a set of container IDs retrieved from Email Records; and
inspecting dmask bits of each container related to the e-mail ID to find a binary value 0 dmask value indicating location of the individual e-mail message.

12. The method of claim 8 further comprising using the Container Record to move e-mail messages to lower cost storage of the data tiers by:
updating a last access timestamp for a container when the container is created or referenced in a new backup operation;
placing new or most recently created containers in higher cost storage; and
moving containers from higher cost storage to the lower cost storage in accordance with one or more data movement policies.

13. The method of claim 12 wherein the data tiers comprise hot, warm, and cold tiers of storage from highest cost to lowest cost storage, and wherein the data movement policies comprise an age of an e-mail message in days.

14. The method of claim 6 wherein the dmask of the Backup record is used to perform a garbage collection operation through a simple query operation.

15. A computer-implemented method of providing data protection for cloud-native electronic mail (e-mail) messages, comprising:
accessing the e-mail message provided as a Software-as-a-Service (SaaS) product and stored in object-based storage format in object storage and including a globally unique identifier (ID) for each message;
grouping e-mail messages together into a Container Data object of a container, wherein the container is configured to be a write once object, and holds up to 1024 e-mail messages, the container holding container data formatted as a number of documents indicator (NID) for messages in a data stream received through an application programming interface (API) of the SaaS product, a respective ID, and respective content data for each message;
storing the Container Data object in a bucket located within a cloud computing account of a public cloud, and including a second BID entry referencing the NID;
defining an Email Record to hold metadata and location information about each e-mail message to be used for partial restore and delete operations;
defining a Container Record to hold metadata and location information about each container;
defining a Backup Record consisting of a reference to a container, a bitmask and timestamp of a respective backup operation, wherein the backup operation is one of a full backup and an incremental backup, and including a third BID entry referencing the NID, the backup record containing one backup per container every backup point-in-time (PIT) to facilitate backup operations to the object store for any point in time; and
first linking the Email Record to the Container Data through an index that references the data ID field and a respective BID/container ID field that references the NID field;
second linking the Backup Record to the Container Data through a respective bucket ID/container ID field that references the NID field; and
third linking the Container Record to the Container Data through a respective BID/container ID field that references the NID field.

16. The method of claim 15 wherein the Container Data object is a data structure comprising a data fields including a number of e-mails in a data stream (Nids) field, an IdData field indicating an absolute byte offset and length of each e-mail in the data stream, and a data field comprising a compressed stream of data from a graph API of the cloud-native e-mail application.

17. The method of claim 16 wherein the Email Record is a data object comprising an e-mail ID field (Eid), a bucket ID field (Bid) indicating a bucket where a container of interest exists, an container ID field (Cid) and an index into a container where an e-mail of interest is stored.

18. The method of claim 17 wherein the Container Record is a data object comprising the Bid, the Cid, a tier field indicating a relative cost of storage media storing the containers, and a last access timestamp indicating a point in time of a most recent write or read of a container.

19. The method of claim 18 wherein the Backup Record is a data object comprising the last access timestamp, a delete mask (dmask) bit indicating a valid or invalid e-mail message in a container for a backup operation, the Bid, and the Cid.

20. A system providing data protection for cloud-native electronic mail (e-mail) messages, comprising:
a Software-as-a-Service (SaaS) product providing native applications generating the-mail messages and stored in object-based storage format in object storage and including a globally unique identifier (ID) for each message;
a Container Data object grouping e-mail messages together, wherein the container is configured to be a write once object, and holds up to 1024 e-mail messages;
a bucket storing the Container Data object within a cloud computing account of a public cloud;
an Email Record data structure to hold metadata and location information about each e-mail message to be used for partial restore and delete operations, the Email record indexing the container data through the ID, and including first bucket ID (BID) entry indicating location of a respective container and referencing the NID;
a Container Record data structure to hold metadata and location information about each container, and including a second BID entry referencing the NID;
a Backup Record data object consisting of a reference to a container, a bitmask and timestamp of a respective backup operation, wherein the backup operation is one of a full backup and an incremental backup, and including a third BID entry referencing the NID, the backup record containing one backup per container every backup point-in-time (PIT) to facilitate backup operations to the object store for any point in time; and
a component grouping the e-mail messages together into a Container Data (CD) object of the container having e-mail message data respectively associated with a data ID field and the NID field, first linking the Email Record to the Container Data through an index that references the data ID field and a respective BID/container ID field that references the NID field, second linking the Backup Record to the Container Data through a respective BID/container ID field that references the NID field, and third linking the Container Record to the Container Data through a respective BID/container ID field that references the NID field.

\* \* \* \* \*